United States Patent
Bryson

[11] Patent Number: 5,905,370
[45] Date of Patent: May 18, 1999

[54] PROGRAMMABLE STEP DOWN DC-DC CONVERTER CONTROLLER

[75] Inventor: Stephen W. Bryson, Cupertino, Calif.

[73] Assignee: Fairchild Semiconductor Corporation, So. Portland, Me.

[21] Appl. No.: 08/851,972

[22] Filed: May 6, 1997

[51] Int. Cl.[6] .............................. G05F 1/40; G05B 24/02
[52] U.S. Cl. ........................................ 323/283; 323/351
[58] Field of Search .................................. 323/265, 282, 323/283, 351, 349

[56] References Cited

U.S. PATENT DOCUMENTS

| | | | |
|---|---|---|---|
| 4,335,445 | 6/1982 | Nercessian | 364/900 |
| 4,350,891 | 9/1982 | Wuerflein | 378/110 |
| 4,761,725 | 8/1988 | Henze | 363/46 |
| 5,028,861 | 7/1991 | Pace et al. | 323/222 |
| 5,079,498 | 1/1992 | Cleasby et al. | 323/283 |
| 5,162,631 | 11/1992 | Hachisuka et al. | 323/283 |
| 5,412,308 | 5/1995 | Brown | 323/267 |
| 5,432,693 | 7/1995 | Anderson | 363/41 |
| 5,475,296 | 12/1995 | Vinsant et al. | 323/223 |
| 5,479,089 | 12/1995 | Lee | 323/282 |
| 5,550,729 | 8/1996 | Wissell | 363/65 |
| 5,671,149 | 9/1997 | Brown | 323/283 |
| 5,675,240 | 10/1997 | Fujisawa et al. | 323/283 |
| 5,691,630 | 11/1997 | Chosa | 323/267 |

FOREIGN PATENT DOCUMENTS

0190110A2  8/1986  European Pat. Off. ........ H02M 3/156

OTHER PUBLICATIONS

Linear Technology Corporation, "Initial Release Final Electrical Specifications for LTC1266/LTC 1266–3.3/LTC 1266–5", pp. 1–20 (Feb. 1995).

Maxim Integrated Products, "Maxim Dual–Output Power–Supply Controller for Notebook Computers", pp. 1–24 (1993).

*Primary Examiner*—Peter S. Wong
*Assistant Examiner*—Bao Q. Vu
*Attorney, Agent, or Firm*—Skjerven, Morrill, MacPherson, Franklin & Friel; Norman R. Klivans; John T. Winburn

[57] ABSTRACT

A programmable DC-DC converter controller with a high speed synchronous controller and a 5-bit programmable DAC provides an operating voltage to an external device (such as a microprocessor) in response to a 5 bit code programmed in the external device. The 5-bit programmable DAC outputs a signal which provides voltages to the external device in increments of e.g. 50 or 100 millivolts, in respectively two different voltage ranges.

12 Claims, 7 Drawing Sheets

5,905,370

PROGRAMMABLE STEP DOWN DC-DC CONVERTER CONTROLLER

BACKGROUND OF THE INVENTION

1. Field of the Invention

This invention relates to programmable power supplies and, more specifically, to a programmable step down DC-DC converter controller.

2. Related Art

The microprocessor has evolved from an integrated semiconductor chip that controls only simple functions to rival the computing power of a mainframe computer. That evolution has brought ever increasing numbers of transistors integrated onto a single chip. For example, the current Intel Pentium® microprocessor chip has well over 5 million transistors. To achieve this density, the size of each transistor has been reduced to the sub-micron level; with each successive design geometry reduction, the corresponding maximum voltage at which the transistor operates has been reduced as well. This changing maximum operating voltage for microprocessors has led to the need for a programmable power supply such that with each successive change in voltage requirement for the microprocessor, the computer system designer does not have to completely re-engineer the associated power supply system. The voltage requirements of the microprocessor has been trending downwards over approximately the past 5 years, from 5 volts for the 386 and 486microprocessors, to 3.3 volts for the Pentium, and now to down to 3.1 volts for the Pentium Pro®. Operating voltages for microprocessors in 1997 will likely be in the range of 2.5 volts.

Previous generations of DC-DC (direct current-direct current) converter controllers provide fixed output voltages or, in some cases, are adjustable by changing a set of external resistors. In the production environment for personal computers, the microprocessor circuit board (also known as a "motherboard") therefore has had to be redesigned each time the operating voltage has been changed by the microprocessor manufacturer. To address the problems caused by the changing voltage requirements, Intel has programmed a voltage identification code (VID) into the Pentium Pro which can be read by a motherboard that has the appropriate capability. The motherboard, if it has the function built-in, then supplies the voltage identified by the VID to the microprocessor. This eliminates the requirement of the system designer to redesign the motherboard each time the microprocessor voltage changes because the microprocessor signals its own required voltage and the controller then automatically supplies the required voltage.

What is needed is a DC-DC converter controller designed with the ability to be programmed to address the changing power supply voltage needs for future lower voltage microprocessors. The DC-DC converter controller must be able to read the VID code programmed into the microprocessor and then supply the voltage called for by the microprocessor VID code.

SUMMARY

According to the present invention, a programmable DC-DC converter controller provides an output voltage called for by a digital input signal (e.g. a VID code) from an external device (e.g. microprocessor). The converter controller includes at least one amplifier to provide the required voltage, a control unit to control the magnitude of the output of the amplifier, and a circuit responsive to the digital input.

The circuit also includes a digital to analog converter which receives the digital input signal from the external device. The digital to analog converter uses a precise reference signal to provide an output voltage at the required voltage. The output voltage delivered to the microprocessor can be selected by the microprocessor in increments of e.g. 100 millivolts in a first voltage range or e.g. 50 millivolts in a second different voltage range.

The present invention is better understood upon consideration of the following detailed description. There is shown and described an embodiment of this invention simply by way of illustration. As will be realized, the invention is capable of other modifications in various aspects, without departing from the scope of the invention. Accordingly, the drawings and detailed description are illustrative in nature and not restrictive.

BRIEF DESCRIPTION OF THE DRAWINGS

The accompanying drawings incorporated in and forming a part of the specification, illustrate the present invention, and together with the detailed description below explain the principles of the invention. In the drawings.

DETAILED DESCRIPTION

Figure 1:
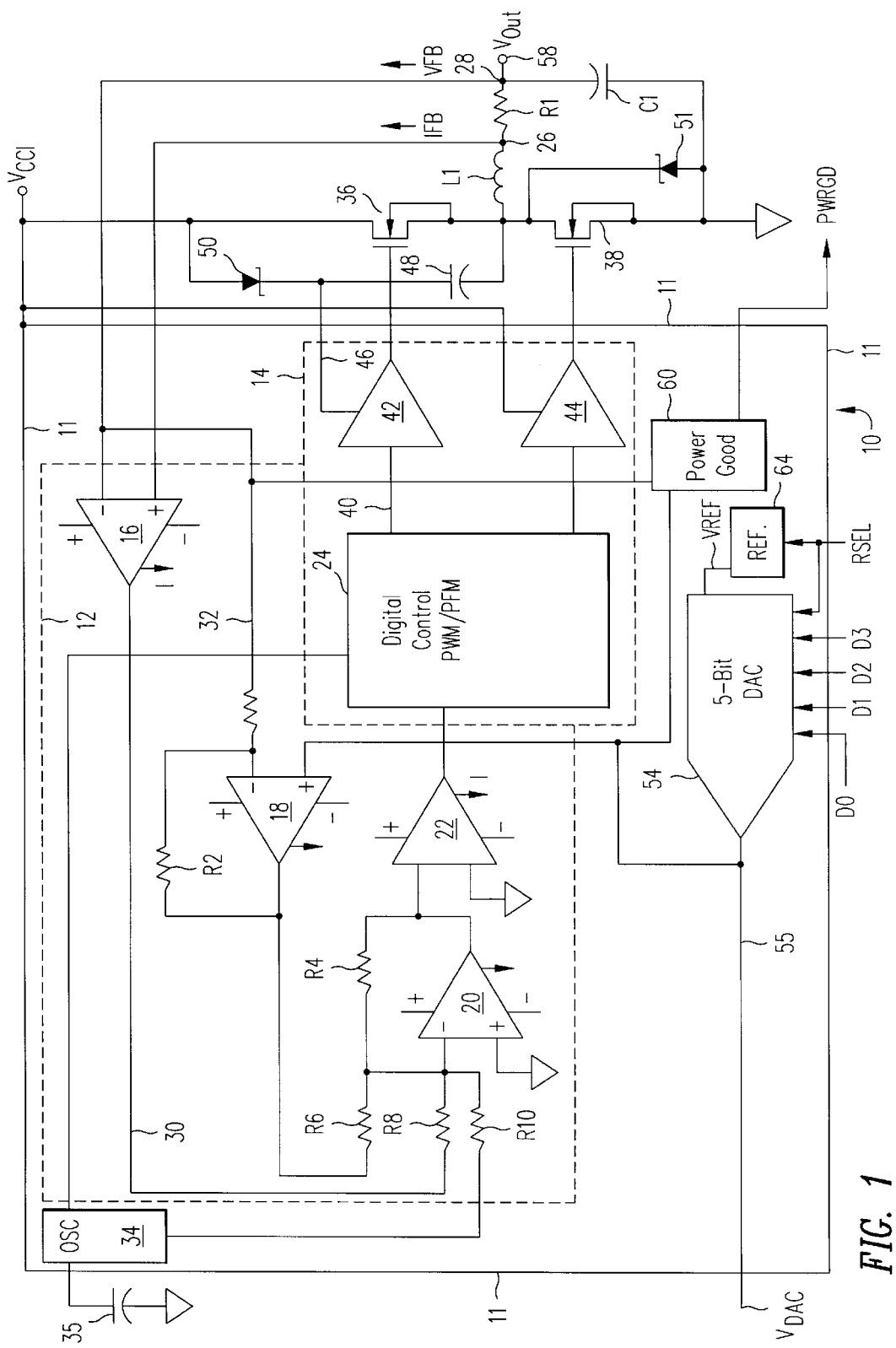
FIG. 1 is a block diagram of the programmable DC-DC converter controller in accordance with the present invention.

Copending and commonly owned U.S. patent application Ser. No. 08/672,487, filed Jun. 26, 1996, entitled "A Programmable Synchronous Step Down DC-DC Converter Controller", Stephen W. Bryson et al. and incorporated herein by reference discloses a DC-DC converter controller similar in many respects to the present controller. However, that controller provides a single range of output voltages with a single increment between each voltage, in the range.

In accordance with the present controller, there are two different voltage ranges. The upper voltage range is selected by placing a logic high signal (1) on the most significant bit in a 5 bit digital-to-analog converter (DAC). The DC-DC converter responds by outputting a voltage in the range of e.g. 2.0 volt to 3.5 volt, based upon the VID code input to the remaining lower four bits of the 5-bit DAC. The lower voltage range is enabled by placing a logic signal (0) voltage on the digital DAC most significant bit. Hence this two range approach provides added flexibility, allowing the associated microprocessor automatically to configure the power supply to output the particular required voltage.

In the upper 2.0 volt to 3.5 volt range there are 100 millivolt steps and the most significant bit of the is set to a logic high signal level. When the DAC's most significant bit is set to a logic low signal level the DC-DC controller outputs the lower voltage range which is in this case 1.3 volt to 2.05 volt in 50 millivolt steps. Of course, these values of the ranges and the steps for each range are merely exemplary. Also, a converter with more than two ranges would also be in accordance with this invention.

In the following description, for purposes of clarity and conciseness of the description, not all of the numerous components shown in the schematic drawings are described. The numerous components are shown in the drawings to provide a person of ordinary skill in the art a thorough enabling disclosure of the present invention. It will be apparent to one skilled in the art that a detailed description of all of the specific components is not required in order to practice the present invention. Therefore, only those components that are affected by the present invention or that are necessary for an understanding of the present invention are shown in the figures and discussed. In addition, well known electrical structures and circuits are shown in block diagram form in order not to obscure the present invention.

The present invention is directed to a programmable synchronous voltage controller that can be configured to deliver in excess of e.g. 16 amperes of output current. During heavy loading conditions, the controller functions as a current-mode PWM (pulse width modulation) step down regulator. Under light loads, the regulator functions in the PFM (pulse frequency modulation) or pulse skipping mode. The controller senses the load level and switches between the two operating modes automatically, thus optimizing its efficiency under all loading conditions.

FIG. 1 shows the present programmable DC-DC converter controller 10. The portion of controller 10 shown within solid line 11 is (in one embodiment) manufactured on a single semiconductor chip (but in other embodiments is of discrete components). The controller 10 includes a main control loop which contains two main sections; an analog control circuit delineated by dashed lines at 12 and a digital control block delineated by dashed lines at 14.

Analog control circuit 12 includes signal conditioning amplifiers 16, 18, and 20 coupled to comparator 22 which provides an input signal to digital control circuit 24. The analog control circuit 12 accepts input signals from the IFB (current feedback) terminal 26 and the VFB (voltage feedback) terminal 28 and establishes a current controlling signal path 30 and a voltage controlling signal path 32. Resistor R1 and inductor L1 coupled to IFB node 26. Resistor R1 develops a voltage across terminals 26 and 28 that is proportional to the output lead current being delivered to terminal Vout. Inductor L1 is the inductive storage element to support the load current that must continuously flow when the switch 36 is turned off. Capacitor C1 is a filter. The voltage controlling path 32 amplifies the VFB signal which is input to signal conditioning amplifier 20. Signal conditioning amplifier 16 determines the difference between the signal at the IFB terminal 26 and the signal at the VFB terminal 28 which is input to signal conditioning amplifier 20. The amplified VFB signal and the difference signal between the VFB and IFB signals are summed together with a slope compensation input from oscillator 34 and coupled into signal conditioning amplifier 20.

The output signal from signal conditioning amplifier 20 is input to comparator 22 which provides the main PWM control signal to digital control circuit 24. Additional comparators (not shown) in the analog control circuit 12 set the thresholds where the controller 10 enters a pulse skipping mode during light loads as well as the point at which a maximum current comparator (not shown) disables the output drive signals to the external power MOSFETs (transistors) 36 and 38. The digital control circuit 24 receives the comparator 22 output signal and a clock signal from oscillator 34 and in response outputs the appropriate output pulses to the output line 40 that is coupled to the gate (control terminal) of external power MOSFET 36. The digital control block 14 utilizes in one version high speed schottky transistor logic in digital control circuit 24, allowing the controller 10 to operate at clock speeds in excess of 1 MHz. The digital control block 14 also provides the break-before-make timing that ensures both external MOSFETs 36 and 38 are not on (conductive) at the same time. Oscillator 34 is a fixed current capacitor charging oscillator. An external capacitor 35 allows for maximum flexibility in setting the frequency of oscillator 34, e.g. from less than 200 KHz to over 1 MHz depending upon the application requirements.

The digital control block 14 includes two identical high current output drivers 42 and 44 which utilize internal high speed bipolar transistors (not shown) arranged in a push-pull configuration. Each driver 42, 44 is capable of e.g. delivering 1 ampere of current in less than 100 nanoseconds. Each driver's power and ground are separated from the overall chip power and ground to provide for switching noise immunity. Driver 42 has a power supply which is "bootstrapped" from a floating capacitor 48. In this configuration, capacitor 48 is alternately charged from power supply $V_{CC1}$ via the schottky diode 50 and then boosted up when MOSFET 36 is turned on. This scheme provides a voltage at node 46 equal to $2*(V_{CC}-V_{ds})$ (diode 50) which is approximately 9.5 volt with VCC1=5 V. This voltage is sufficient to provide the 9 volt gate drive to the external MOSFET 36 required in order to achieve a low $R_{DS,ON}$ (resistance-drain to source, on). Since the "low side" synchronous MOSFET 38 is referenced to ground, its gate drive voltage does not need to be boosted. (In other embodiments, only one driver 42 and one MOSFET 36 are provided.) Diode 51 absorbs the current during the transition between the switch 36 turning on and switch 38 turning off and vice-versa.

As shown, two power supplies are present, VCC1 (e.g. 12 volts) and VCC2 (e.g. 5 volts).

The controller 10 is referenced to a reference voltage VREF supplied by reference voltage circuit 64 which includes a precision band-gap circuit and is described in detail below. The internal resistors (not shown) in the band-gap circuit of the reference voltage circuit 64 are precisely trimmed to provide a near zero temperature coefficient (TC). The VREF signal is coupled to 5-bit DAC 54, also supplied with five digital input signals D0, D1, D2, D3, D4, RSEL which specify a voltage range and value to select the required output voltage at $V_{OUT}$ 58. For example, the Pentium Pro specification guideline requires the DC-DC converter output to be directly programmable via a 4-bit voltage identification (VID) code D0, D1, D2, D3 shown in Table I below. This code together with the 5th bit RSEL scales the DAC output voltage $V_{DAC}$ on line 55. It is to be understood that Table I shows the above described upper voltage range which is selected by setting the value of RSEL (most significant bit) to a logic high level (1).

TABLE I

VID Codes for Pentium Pro ™

| Data Bits | | | | | |
|---|---|---|---|---|---|
| D3 | D2 | D1 | D0 | RSEL | $V_{OUT}$ |
| 1 | 1 | 1 | 1 | 1 | 2.0 |
| 1 | 1 | 1 | 0 | 1 | 2.1 |
| 1 | 1 | 0 | 1 | 1 | 2.2 |
| 1 | 1 | 0 | 0 | 1 | 2.3 |
| 1 | 0 | 1 | 1 | 1 | 2.4 |
| 1 | 0 | 1 | 0 | 1 | 2.5 |

TABLE I-continued

VID Codes for Pentium Pro ™

| Data Bits | | | | | |
|---|---|---|---|---|---|
| D3 | D2 | D1 | D0 | RSEL | $V_{OUT}$ |
| 1 | 0 | 0 | 1 | 1 | 2.6 |
| 1 | 0 | 0 | 0 | 1 | 2.7 |
| 0 | 1 | 1 | 1 | 1 | 2.8 |
| 0 | 1 | 1 | 0 | 1 | 2.9 |
| 0 | 1 | 0 | 1 | 1 | 3.0 |
| 0 | 1 | 0 | 0 | 1 | 3.1 |
| 0 | 0 | 1 | 1 | 1 | 3.2 |
| 0 | 0 | 1 | 0 | 1 | 3.3 |
| 0 | 0 | 0 | 1 | 1 | 3.4 |
| 0 | 0 | 0 | 0 | 1 | 3.5 |

The VID codes of Table I function as follows. The designer of a microprocessor, e.g. the Pentium Pro, determines that the microprocessor is to operate at 2.8 volts. The 5-bit VID code for 2.8 volts (01111) is programmed into the microprocessor and is read as an input signal $D_0$, $D_1$, $D_2$, $D_4$, RSEL by DAC 54 in the controller 10. DAC 54 then provides an analog output signal VDAC on line 55 which is input to amplifier 18 which is part of analog circuit 12, and as described above, an output signal of analog circuit 12 is converted into a digital signal by the comparator 22, which digital signal is fed into the digital control block 24 and controls the switching of the drivers 42 and 44. This in turn, causes the requested voltage (2.8 volt) to be output at $V_{OUT}$ 58. For stable operation (filtering) under all loading conditions, a 10K ohm pull-up resistor and a 0.2 microfarad decoupling capacitor (not shown) can be connected to line 55.

The lower voltage range, as described above, is selected by setting the value of the RSEL bit logic low (0). This generates a lower voltage range from 1.3 volt to 2.05 volt in 50 millivolt increments. The associated VID table is not shown since it is otherwise similar to that of Table 1.

The controller 10 includes in one embodiment a "power good" circuit 60 which provides a constant voltage monitor at the VFB terminal 28 (which is also $V_{OUT}$). Power good circuit 60 compares the signal at the VFB terminal 28 to the VDAC signal and outputs an active-low interrupt signal on line "PWRGD" if the power supply voltage (at $V_{OUT}$ 58) exceeds a selected percentage, for example, ±7%, of its nominal value.

Figure 2:
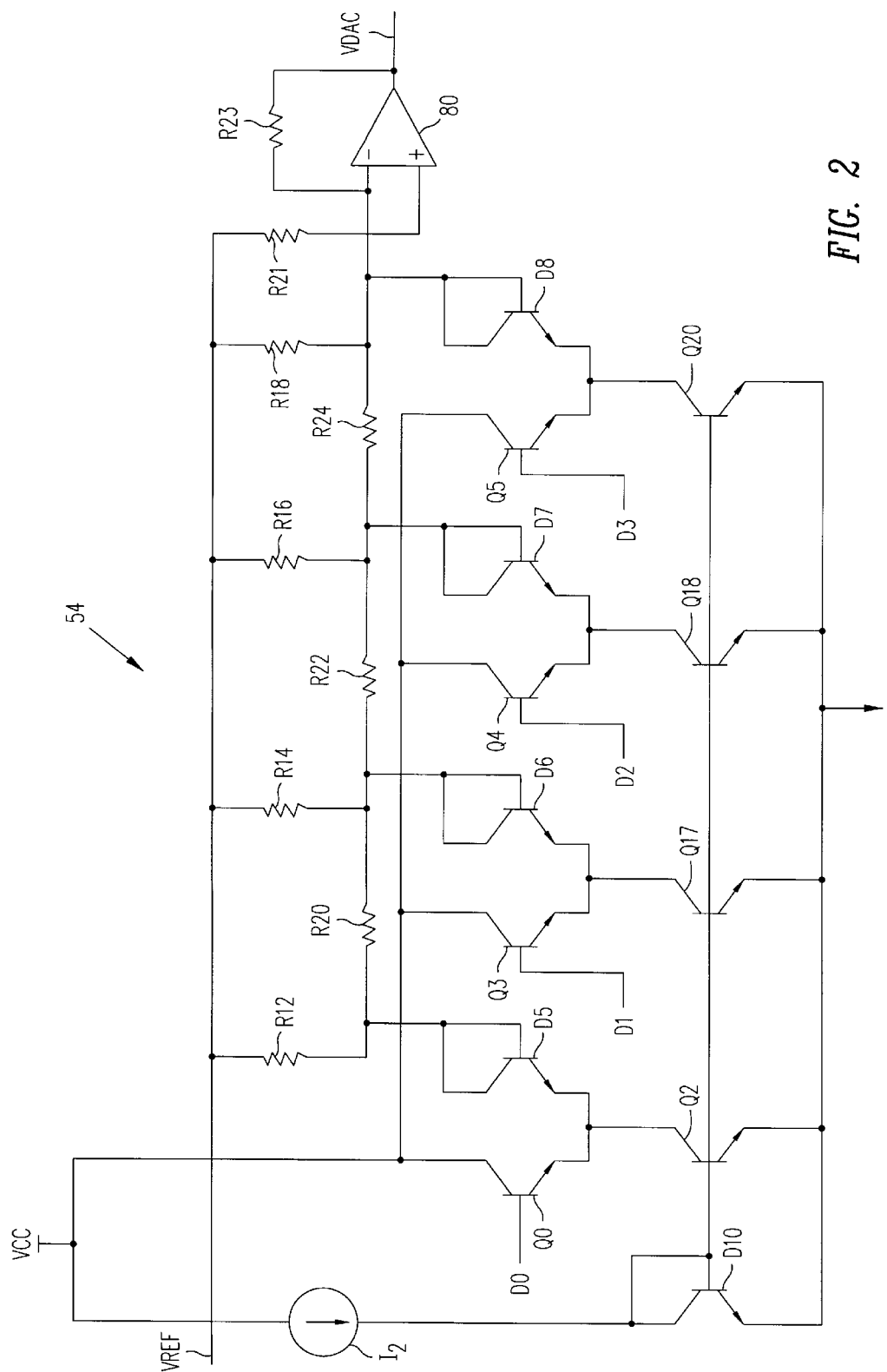
FIG. 2 is schematic diagram of a digital to analog converter as used in the controller of FIG. 1.

FIG. 2 is a schematic of DAC 54. The DAC 54 of FIG. 2 is representative of a number of digital to analog converters that could be used in the present invention. The input terminals ($D_0$, $D_1$, $D_2$, $D_3$) correspond to the similarly labelled code values shown in Table I and in FIG. 1 and are received from an external device (such as the associated microprocessor). These input code signals either turn on or turn off transistors Q0, Q3, Q4, and Q5 respectively. The resistive ladder, which is known as an R-2R resistive ladder and includes resistors R12–R24, provides an incremented output voltage VDAC depending upon the values of input codes $D_0$, $D_1$, $D_2$, $D_3$ and as discussed above, the voltage increment in this example is 100 millivolts.

Figure 3:
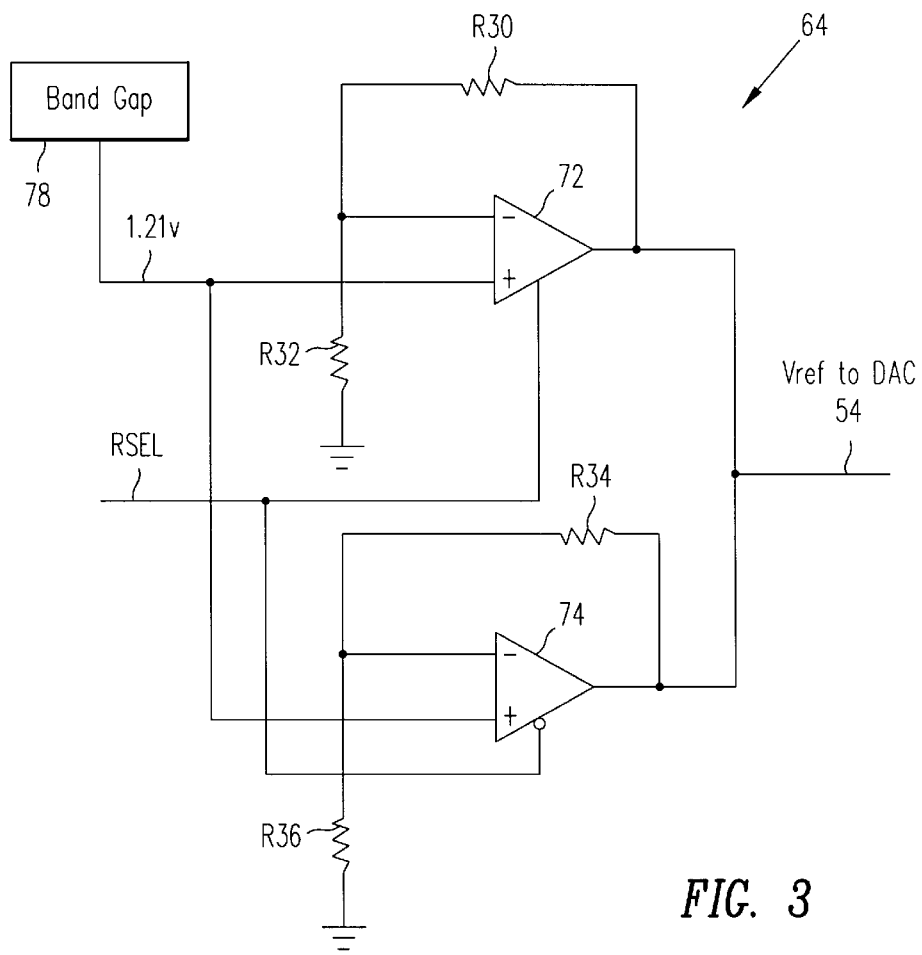
FIG. 3 is a schematic diagram of a circuit for selectably providing one of two reference voltages to the digital to analog converter of FIG. 2.

With reference to FIGS. 1 and 2, the five bit DAC 54 is driven by a reference voltage VREF output by reference voltage circuit 64. Detail of circuit 64 is shown in FIG. 3 and includes a conventional band gap reference circuit 78 which generates a 1.21 volt reference voltage using band gap diodes. This 1.21 volt band gap reference is input to the positive terminal of the first gain selection amplifier 72 and to the positive input terminal of the second gain selection amplifier 74. The control terminal of each of amplifiers 72, 74 is connected to the RSEL code line. Also provided are resistors R30, R32, R34 and R36. Hence the value of RSEL (which is digitally one or zero) determines whether the output voltage VREF to DAC 54 is in the high or low voltage range by setting the value of the lowest point in each voltage range, e.g. either 1.3 volts or 2.0 volts. Based upon the RSEL value, only one of the amplifiers 72, 74 is enabled to allow the band gap voltage of 1.21 volts to be gained up to the appropriate voltage level for each range.

Figure 4:
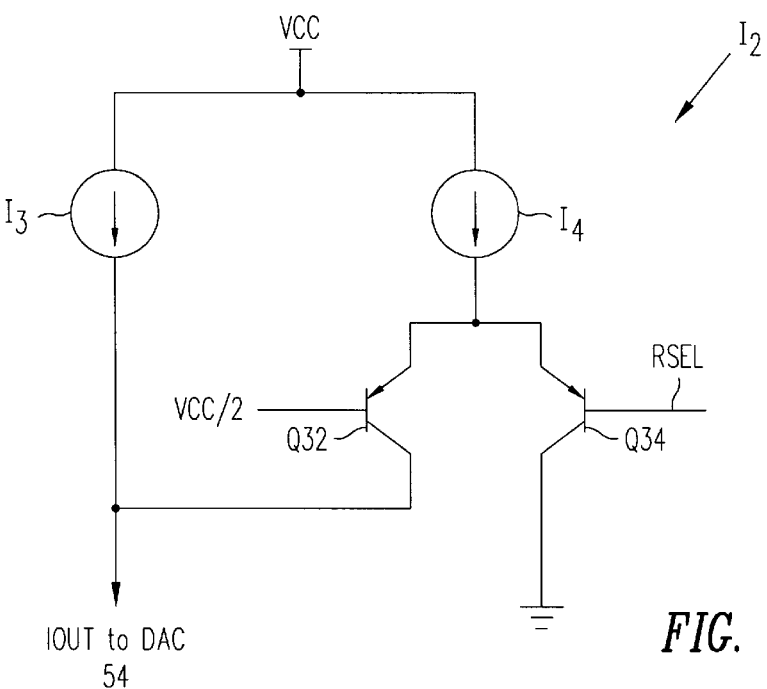
FIG. 4 is a schematic diagram of a circuit for selectably providing one of two levels of current to the digital-to-analog converter of FIG. 2.

The digital analog converter 54 of FIG. 2 includes a variable (selectable) current source I2; detail of current source is shown in FIG. 4. Current source I2 selects the DAC step size for each of the two ranges, depending again on the value of the most significant bit RSEL of the VID code. When the RSEL bit is set to a logic high (1), the upper code range is enabled and thus the step size is 100 millivolt. The output currents of two current sources I3, I4 are summed by transistors Q32, Q34 to provide this step current at the node IOUT, to DAC 54. When the RSEL bit is set to the low value (logic 0) enabling the lower voltage range and thus the 50 millivolt step size, current source I4 is turned off thus reducing the step current into the DAC 54 by one half.

This use of the RSEL bit to control both the initial voltage and the step size of each range is shown in FIG. 1 where the RSEL input signal is coupled both to the reference voltage circuit 64 and to the 5 bit DAC 54; in FIG. 1 it is to be understood that the current source I2 of FIGS. 2 and 4 is part of DAC 54.

Figure 5A:
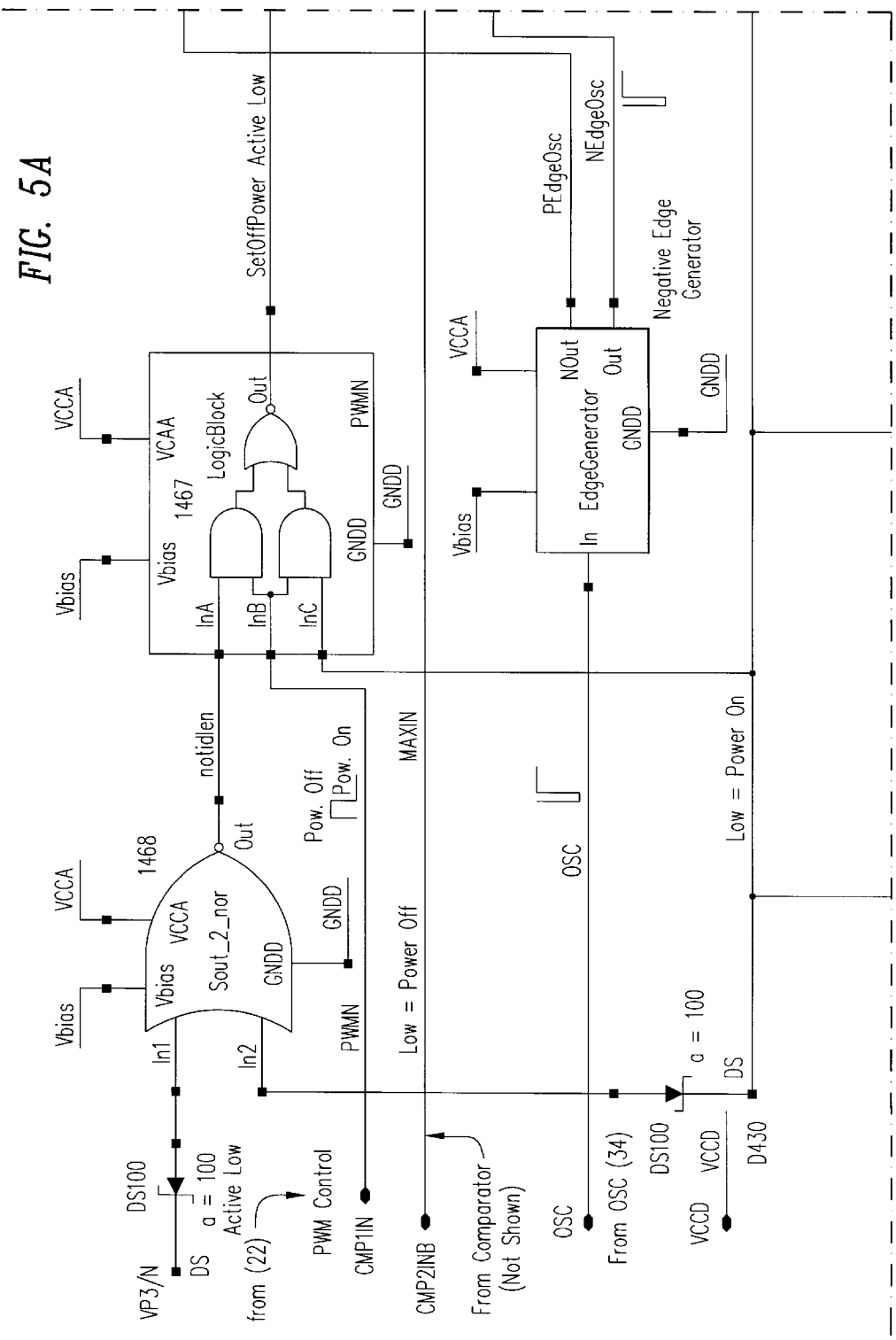
FIGS. 5A–5D together are a schematic diagram of a digital control circuit as used in the controller of FIG. 1.
Figure 5B:
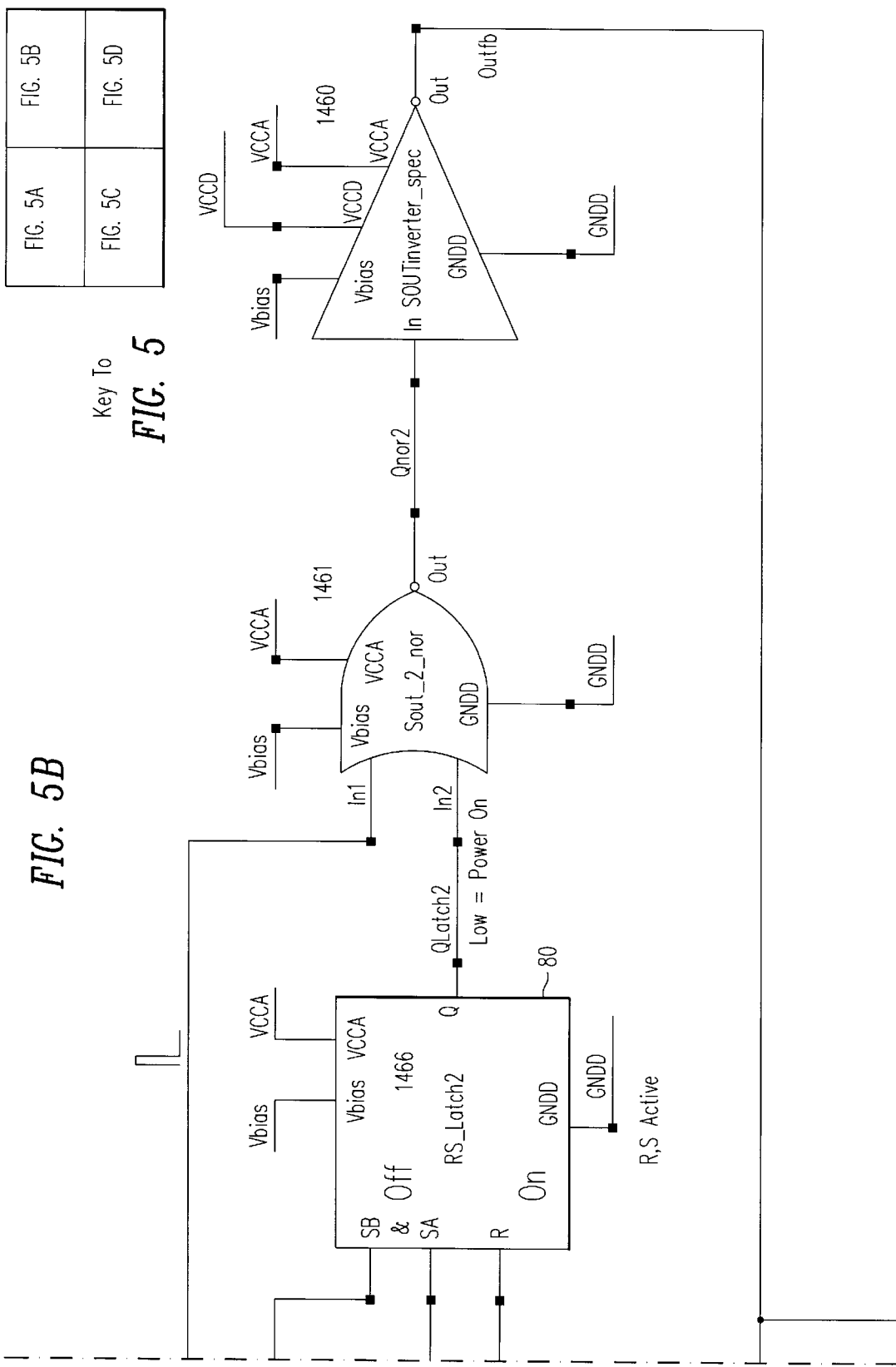
Figure 5C:
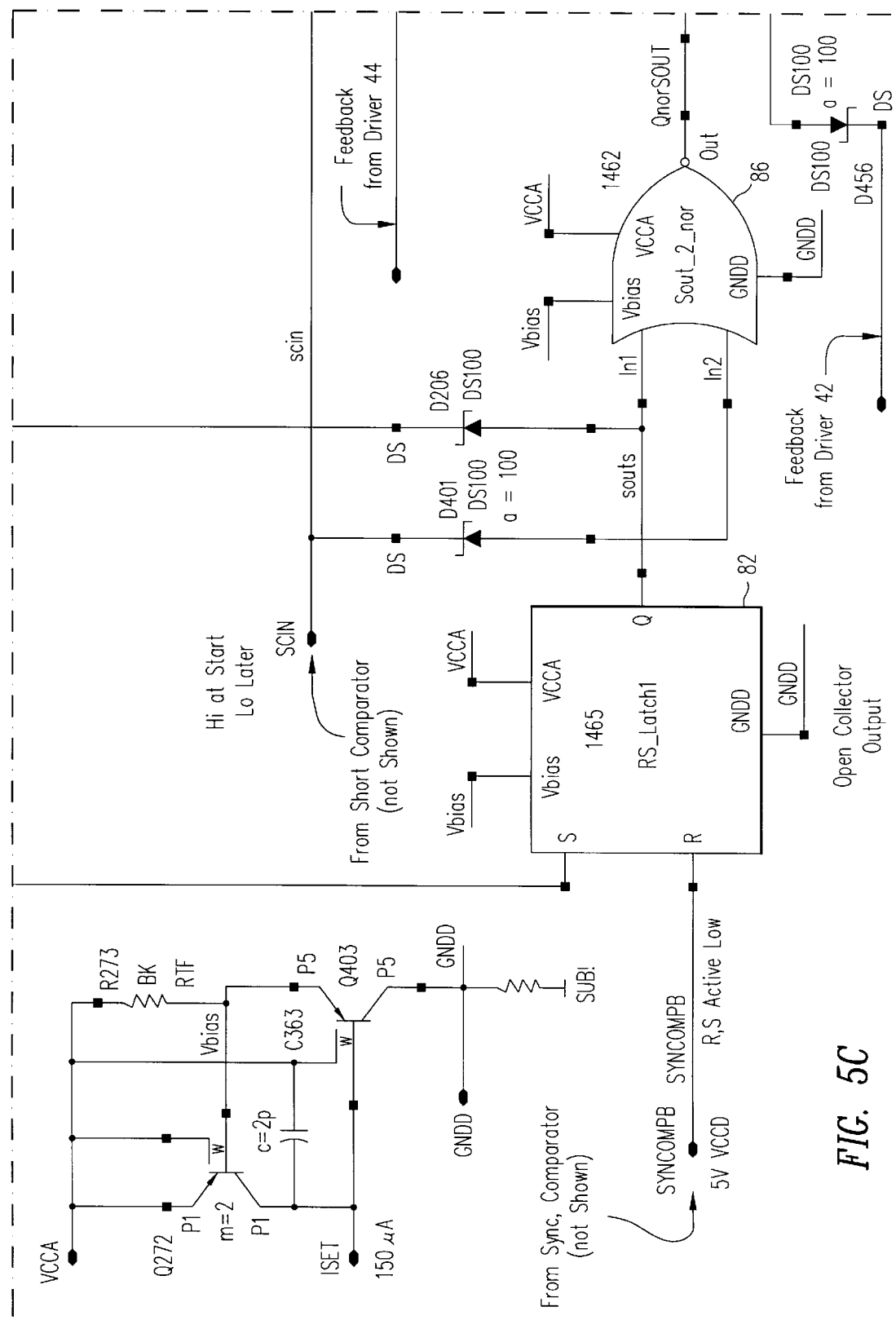
Figure 5D:
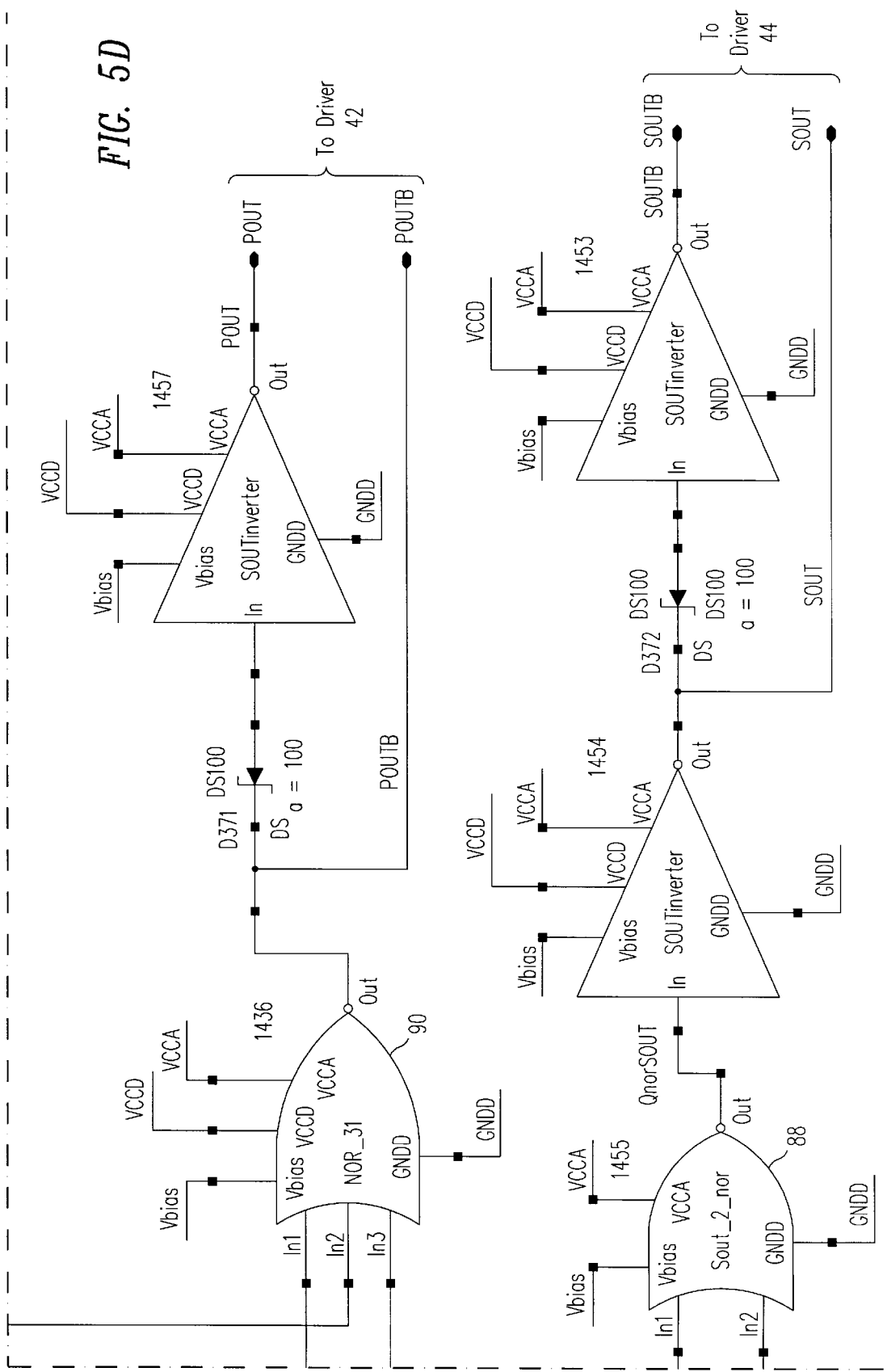

A schematic of the digital control circuit 24 of FIG. 1 is shown in FIGS. 5A and 5B. Without describing each component shown therein, circuit 24 operates as follows. The basic control signal (CMP1IN) is the digital signal that controls the off timing of the output driver 42. The start time for driver 42 is set by the OSC rising edge as it resets the RS latch 80. The CMP2IN signal then sets the latch 80 some time later, based upon the feedback signal generated in the analog block 12.

The lower driver 44 is slaved to work at the opposite polarity of driver 42, i.e. when driver 42 is on, driver 44 is off; when driver 42 is off, driver 44 is on. The RS latch 82 and NOR gates 86 and 88 insure that the timing is such that drivers 42, 44 are not both on at the same time. NOR gate 90 will not allow driver 42 to be on while driver 44 is still on. Also the input signal SCIN disables driver 42 when there is an output short circuit to either Vcc or ground. The other input signals in FIG. 5A are as shown; comparators (not shown) provide the CMPIN3B, CMP2INB, SCIN, and SYNCOMPB signals. Signals SCIN and CMP2INB thereby provide short circuit protection, and CMPIN3B indicates an idle state, while SYNCOMPB resets latch 82.

The foregoing description is for purposes of illustration and description. It is not intended to be exhaustive or to limit the invention to the precise form disclosed. Modifications or variations are possible in light of the above teachings. The disclosed embodiment was chosen and described to provide the best illustration of the principles of the invention and its practical application to thereby enable one of ordinary skill in the art to utilize the invention in various embodiments and with various modifications. All such modifications and variations are within the scope of the invention as determined by the appended claims.

What I claim is:

1. A programmable converter, comprising:
    at least one amplifier providing an output signal;
    a control unit to control a magnitude of the output signal of said at least one amplifier; and a circuit, responsive to a digital input signal, having an output signal coupled to said control unit specifying the magnitude of the output signal of said at least one amplifier, wherein the circuit specifies at least two ranges of the magnitude, each range having a specified number of increments; said circuit including a digital to analog converter, said digital input signal received from an external device, said digital input signal including a multi-bit signal with one bit specifying one of said ranges and the remaining bits specifying the magnitude of said output signal.

2. The programmable converter of claim 1, wherein said digital to analog converter receives a five bit digital input signal from said external device specifying said range and a voltage required by said external device and converts said digital input signal to an analog output signal.

3. The programmable converter of claim 2, wherein said analog output signal comprises said output signal to said control unit specifying the magnitude of the output signal of said at least one amplifier.

4. The programmable converter of claim 3, wherein said analog output signal of said digital to analog converter is coupled to said control unit.

5. The programmable converter of claim 2, wherein said voltage specified by said digital input signal is determined by a value of said digital input multiplied by a specified voltage increment.

6. The programmable converter of claim 5, wherein said external device specifies a required voltage in the specified number of increments.

7. The programmable converter of claim 2, wherein said external device comprises a microprocessor.

8. The programmable converter of claim 5, wherein said specified voltage increment is 50 and 100 mV in respectively each of the two ranges.

9. The programmable converter of claim 1, wherein said at least one amplifier, said control unit, and said circuit are integrated on a single semiconductor chip.

10. The programmable converter of claim 1, including said control unit having a clock speed in excess of one megahertz.

11. The programmable converter of claim 1, including coupling said range specifying bit to a reference voltage device, which specifies and couples a range selection signal to said converter.

12. The programmable converter of claim 1, including a power good circuit coupled to said output signals of said amplifier and said converter which compares said signals and generates an interrupt signal if said comparison is out of a selected range.

* * * * *